United States Patent [19]

Hartman et al.

[11] Patent Number: 5,419,859
[45] Date of Patent: May 30, 1995

[54] METHOD OF FORMING PIPE INSULATION WITH AN ADHESIVE CLOSURE

[75] Inventors: David Hartman, Tottenham; Steven Hartman, Erin; Robert N. Jepson, Georgetown, all of Canada

[73] Assignee: Industrial Thermo Polymers Limited, Mississauga, Canada

[21] Appl. No.: 160,097

[22] Filed: Dec. 1, 1993

Related U.S. Application Data

[63] Continuation-in-part of Ser. No. 996,602, Dec. 24, 1992, abandoned.

[51] Int. Cl.⁶ .................. B29C 44/20; B29C 44/50
[52] U.S. Cl. ............................ 264/51; 264/146; 156/85; 156/160; 156/218; 156/289
[58] Field of Search .............. 264/230, 51, 146; 156/218, 289, 85, 160, 229

[56] References Cited

U.S. PATENT DOCUMENTS

| | | | |
|---|---|---|---|
| 3,033,727 | 5/1962 | Cram et al. | 156/53 |
| 4,001,065 | 1/1977 | Penneck et al. | 156/189 |
| 4,271,218 | 6/1981 | Heckel et al. | 156/218 |
| 4,584,217 | 4/1986 | McClintock | 428/41 |
| 4,586,971 | 5/1986 | Wallace, Jr. | 156/85 |
| 4,605,457 | 8/1986 | Guy | 156/160 |
| 4,713,271 | 12/1987 | Searl et al. | 428/43 |
| 4,844,762 | 7/1989 | Schroder | 264/146 |
| 4,874,648 | 10/1989 | Hill et al. | 156/289 |
| 5,234,520 | 8/1993 | McClintock | 156/289 |

*Primary Examiner*—Allan R. Kuhns

[57] ABSTRACT

A method for applying a closing tape to an extruded foam article is disclosed. The tape is applied immediately after the article is extruded and while the article is still subject to shrinkage, which is common with extruded foamed products. The tape is prestressed and is of a material to alleviate the problems associated with shrinkage. This method is particularly appropriate for applying a closing tape to an extruded polyethylene pipe insulation product which has been longitudinally slit to allow the pipe to be located interior to the insulation. The tape has one side attached to one side of the slit with the other portion of the tape being positioned for closing the slit by engaging the opposite side of the slit. A pressure sensitive adhesive is provided on the tape and a release liner protects the adhesive on the other portion of the tape.

9 Claims, 9 Drawing Sheets

METHOD OF FORMING PIPE INSULATION WITH AN ADHESIVE CLOSURE

CROSS-REFERENCE TO RELATED APPLICATIONS

This application is a continuation-in-part of application Ser. No. 07/996,602 filed Dec. 24, 1992, now abandoned.

FIELD OF THE INVENTION

The present invention relates to pipe insulation and in particular to pipe insulation having a longitudinal cut therein for application over a pipe and means for closing of the cut once the insulation has been applied to a pipe.

BACKGROUND OF THE INVENTION

Various approaches have been proposed for effectively allowing the closure of pipe insulation by means of a closing tape attached to the pipe insulation adjacent a radial cut in the pipe insulation. One such structure is shown in U.S. Pat. No. 4,584,217. In this case, a solvent-based adhesive tape has been applied to the pipe insulation and effectively closes the cut by bridging the pipe insulation on either side of the cut. The adhesive must also overcome the tendency of a pipe located interior to the insulation spreading the cut. Other arrangements have made use of an adhesive which adheres to the opposed faces of the cut, such that when the pipe insulation is pushed together to close the cut, the opposed faces adhesively engage and maintain the closed position.

The closure of pipe insulation is difficult, in that typically the pipe insulation is extruded using a foamed polyethylene type material and, thus, the opposed faces of the cut are through the cell structure and adhesion to these surfaces is somewhat difficult when a preformed adhesive layer is applied to the surface. A tape secured to the outer skin of the pipe insulation is also difficult to secure due to poor adhesion with the extruded skin of the article and ready exposure to the elements.

Another problem is with respect to the ability to apply the tape to the pipe insulation in an effective manner. The product, when initially extruded, is of a certain diameter and length, and for a period of at least about 24 hours after extrusion, the product will continue to shrink. Shrinkage is typically in the order of 2%. It has therefore been the practice to produce the pipe insulation by extrusion, cut or partially cut the material to form a longitudinal slit, cut the extruded product to length and thereafter store the material for a length of time sufficient to allow the product to shrink. After shrinkage has occurred, a closing tape is applied to the article adjacent the longitudinal slit. Unfortunately, this results in a two stage process with the tape being applied to the article only after the article has been stored for a certain period of time. It is certainly preferable to apply a tape when the pipe insulation is being produced, but application of the tape at this time will result in wrinkling of the tape, possible poor adhesion of the tape to the product, and the appearance of an inferior product.

SUMMARY OF THE INVENTION

A foamed polyethylene article is disclosed having an outer peripheral surface and an inner peripheral surface, with the peripheral surfaces defining a hollow cavity running the length of the article. The foamed article is slit in the length of the article between the outer and inner peripheral surfaces to allow a pipe to be forced through the slit and into the hollow cavity. A pressure sensitive adhesive is directly applied to the article to at least one of the peripheral walls along the slit with removable release film covering the adhesive. The removable release film is easily elongated under low tension forces and is initially applied in a tensioned state to cover the adhesive after the adhesive has been applied to the foamed article. Preferably, the release material is a low density polyethylene, and preferably a pressure sensitive hot melt adhesive is spray-applied to the foamed articles on the opposed surfaces adjacent the slit.

According to the invention, an in-line method of producing pipe insulation is taught having a longitudinal slit therein with an applied pressure sensitive adhesive located for adhesively bonding the opposed walls at the slit. A removable release film is applied under tension to cover and protect the applied adhesive until required. The method comprises extruding foamed pipe insulation which is subject to post extrusion shrinkage in the order of about 2%. The extruded pipe insulation is cooled and the pipe insulation is slit longitudinally to allow the pipe insulation in its final application to be forced over a pipe to sleeve the pipe. The method includes spreading the slit pipe insulation to expose wall sections of the insulation either side of the slit, applying a pressure sensitive adhesive to at least one of the exposed wall section, tensioning a removable release substrate under low tension force to cause an elongation thereof in the order of about 2%, and applying said removable release substrate to said foamed article to cover said pressure sensitive adhesive. The pressure sensitive adhesive transfers the tension force to the article which is of sufficient structural strength to maintain the tensioning force. The subsequent shrinkage of the foamed pipe insulation relieves the tensile force in the removable release liner. In this way, the product shipped to a customer has already undergone shrinkage and the release substrate fully covers in a flat manner the pressure sensitive adhesive.

In a preferred embodiment the pressure sensitive adhesive is spray-applied to the pipe insulation.

In yet a further aspect of the invention the adhesive is a pressure sensitive hot melt adhesive which is at a temperature about or above the melt temperature of the foamed article and is sprayed on the product through an air gap and contacts the article with an evenly distributed spray at a temperature about the melt temperature of the article.

According to an aspect of the invention the pressure sensitive hot melt adhesive is applied to both wall sections adjacent the slit. In this case the release substrate is centrally located in a V shape and the wall sections are forced together against the V section to cover and protect the applied adhesive. The V section is subsequently split into two sections, one for each of the opposed walls.

In a preferred embodiment the slit is a nonradial slit (preferably in a tangential manner) to increase the width of the exposed wall sections and improve adhesion properties of the final product.

It has been found that a pressure sensitive adhesive can be matched to the material of the pipe insulation whereby effective adhesion is maintained when the product is in its initial larger shape and, thus, the adhesive can maintain the stretched condition of the film. With shrinkage, this stress is relieved.

The use of a suitable polypropylene based film or a suitable linear low density polyethylene based film allows the adhesive to maintain the stretched condition of the tape at application, which is subsequently relieved during shrinkage of the insulation. The film, the adhesive and the pipe insulation cooperate to maintain the initial stretched or stressed state of the film which is progressively relieved as the product shrinks.

With the method, the adhesive and film are applied in-line as the product is being extruded. This greatly simplifies manufacturing and packaging of the product, as it is completed at the time of manufacture and shrinkage can occur afterwards, as would be the case if the pipe insulation was being manufactured without the adhesive closing arrangement. There is no requirement to reprocess the produced pipe insulation once shrinkage has been completed.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
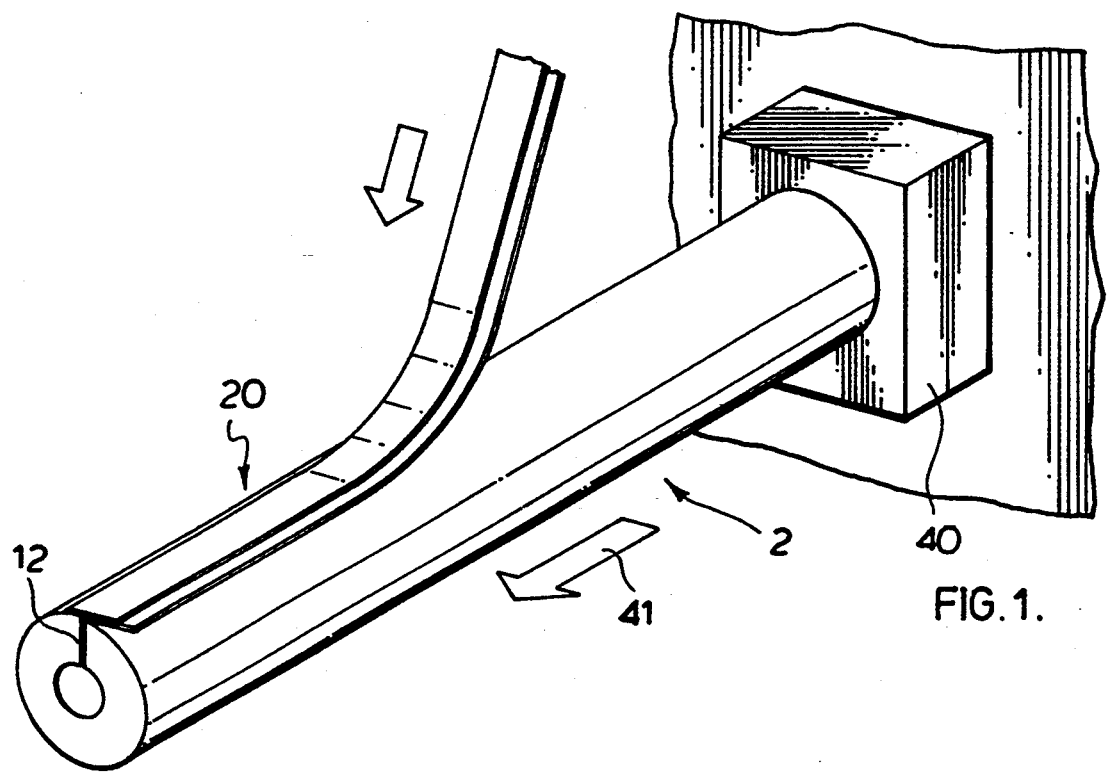
FIG. 1 is a partial perspective view showing extrusion of the pipe and application of a closing tape.

Foamed pipe insulation 2, preferably low density polyethylene pipe insulation, is extruded as illustrated in FIG. 1 and is shown exiting the die 40 with the product being extruded in the direction of the arrow 41. In actual practice, the pipe insulation as it exits the die 40 is quite hot and it is often water cooled to remove heat from the extruded product. This water cooling would occur prior to application of the closing tape 20. If water cooling is used, the pipe insulation 2 can be stripped of water prior to application of the tape.

The polyethylene pipe insulation has an outer peripheral wall 4 and an inner peripheral wall 6, which collectively define a hollow center 8. The pipe insulation between the inner and outer walls is cellular. Typically these are closed cells or predominantly closed cells, however, it is possible to make pipe insulation with open cells or a large percentage of open cells, if so desired. In any event, the outer peripheral wall 4 is the skin of the extruded product and this outer skin is difficult to adhere to for many adhesives. A slit 12 is formed and cooperates with the closing tape 20 whereby the closing tape can maintain an abutting relationship of the pipe insulation at the slit after the pipe insulation has been applied to a pipe.

For purpose of illustration and description, the slit in the insulation allows access to the hollow interior of the insulation. In many cases, it is preferred to stop the slit adjacent the interior wall. The user then breaks through the thin wall which remains when the insulation is installed on a pipe. This thin wall serves to maintain the round shape of the insulation during shipping or packaging of the product. Therefore, it is preferred to leave this thin wall which is subsequently broken by the user during installation.

Figure 2:
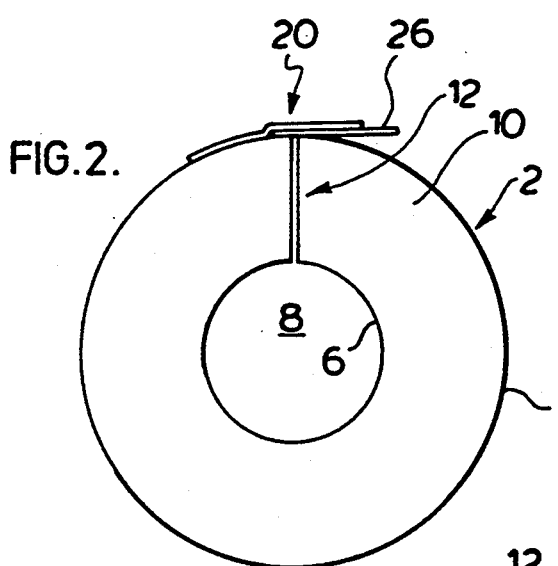
FIG. 2 is a cross sectional view of the pipe insulation with the closing tape secured to the pipe insulation, but allowing full access to the cut in the pipe insulation.
Figure 3:
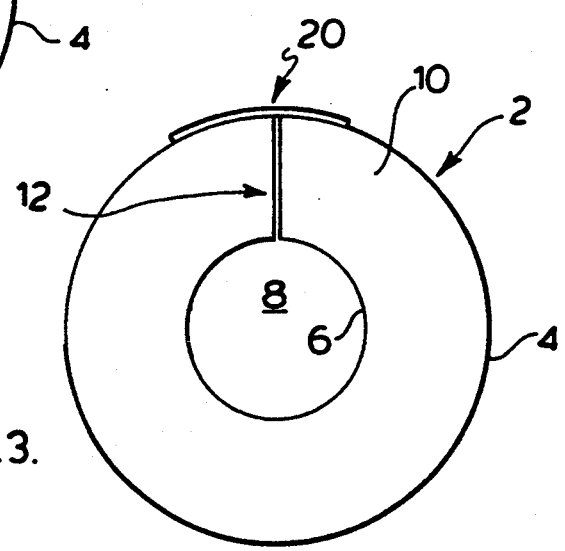
FIG. 3 is a cross sectional view showing the pipe insulation and the slit in the pipe insulation being closed by the tape.

As shown in FIG. 2, the closing tape 20 includes a release liner 26 which is maintained on a portion of the tape to allow the user, after the pipe insulation has been applied to a pipe, to remove the liner 26 and then adhere the tape to the opposite side of the pipe insulation and thereby close and maintain the slit 12 closed. The tape as adhered to the pipe insulation to maintain the slit 12 closed is shown in FIG. 3 and it can be seen that the release liner 26 has been removed, which can easily be accomplished as it overhangs the actual tape, as illustrated in FIG. 2, and the tape has then been applied either side of the slit 12.

The release liner is preferably a 0.92 gauge low density or linear low density polyethylene release strip coated with silicone on the side facing the adhesive. The closing tape 20 can be prestressed to undergo an elastic deformation in the order of about 2%, with the resulting tensile force being of a magnitude which is successfully opposed by the adhesive bond between the tape and pipe insulation. This tensile force is reduced by using a relatively thin tape and by selection of the material of the tape, bearing in mind the adhesion requirements.

Figure 2A:
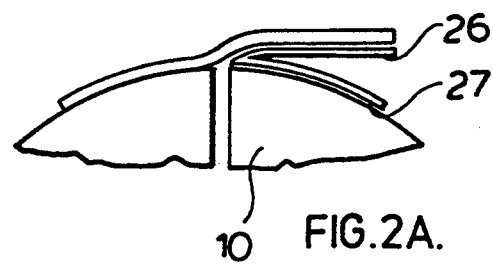
FIG. 2A is a partial sectional view of an alternate embodiment.
Figure 12:
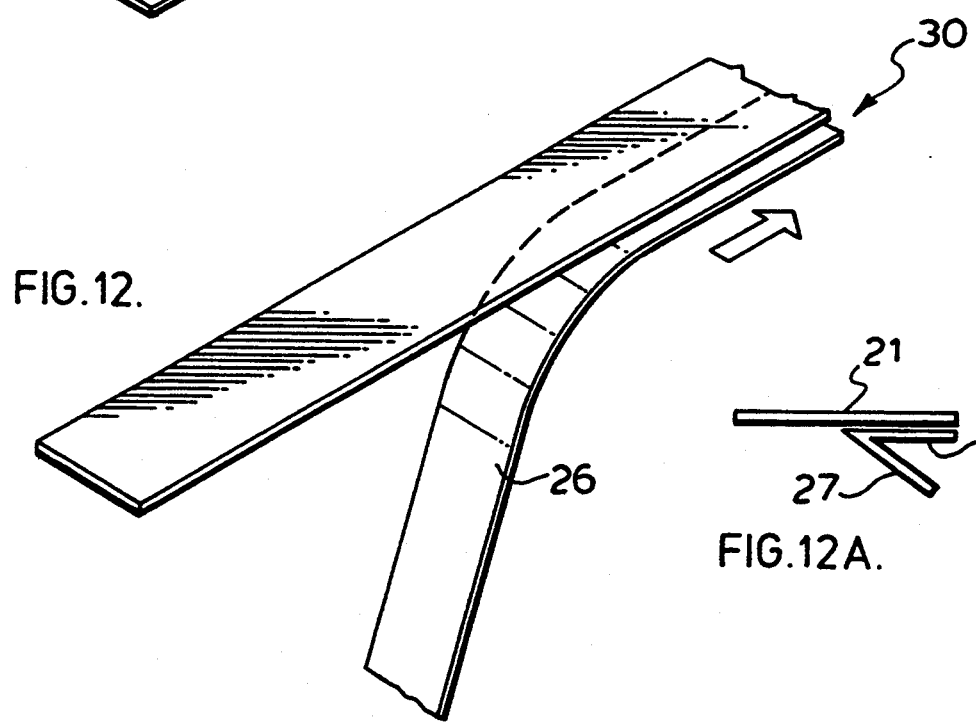
Figure 12A:
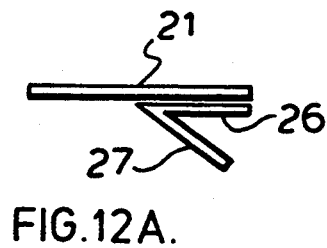
FIG. 12A is a sectional view of an alternate type embodiment.

FIG. 2A is a sectional view showing an alternate embodiment where the release liner is folded upon itself to expose the pressure sensitive adhesive for securing of the tape to the polyethylene foamed product. The folded release liner forms a tab 27 immediately adjacent the slit or cut 12. This tab simplifies removal in a manner away from the slit 12 due to a peeling action of the release liner whereby the previous adhesive bond of the tape to the formed product is essentially unaffected. More care must be exercised if the release liner is removed by a tab at the exterior edge of the tape. FIG. 12A shows the tape with the folded release liner prior to application to the foamed polyethylene product. In some applications, the release liner may merely be folded upon itself without complete removal and reapplied to the tape body, whereas in other cases, the release liner will be removed from the tape and reapplied in a folded condition.

Figure 4:
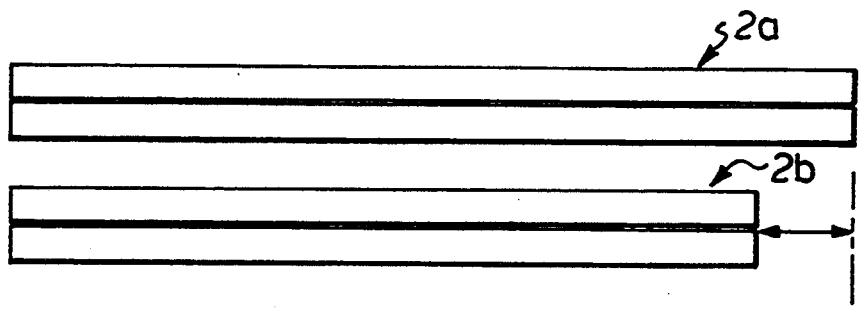
FIG. 4 is a comparative side view showing the pipe insulation as initially extruded relative to the same pipe insulation after shrinkage has occurred.

One problem associated with applying a closing tape to extruded foam product, such as an extruded polyethylene foam product, is due to shrinkage of the product after extrusion. This principle is illustrated in FIG. 4. The pipe insulation shown as 2a in FIG. 4 would be the length of the product after initial extrusion. This product will then undergo shrinkage, as indicated in FIG. 4B, for a period anywhere from 24 to 48 hours or more. The pipe insulation 2b is substantially shorter than the pipe insulation 2a. This causes a problem with respect to the preferred option of securing of the closing tape to the article as it is extruded. Shrinkage is typically in the order of 2% with respect to extruded low density polyethylene foam products.

Figure 5:
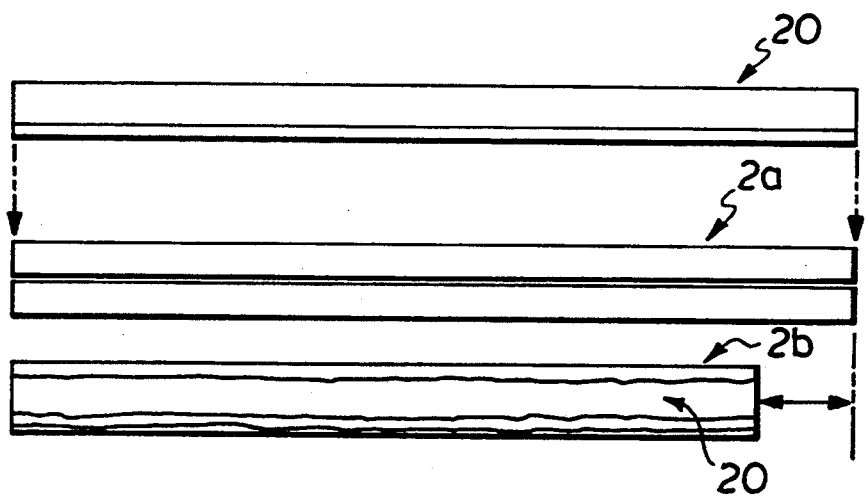
FIG. 5 is a comparison side view showing a tape being applied to a piece of pipe insulation prior to shrinkage relative to the form of the product and the buckling of the tape that would occur after shrinkage.

As shown in FIG. 5, a closing tape 20 secured to an extruded pipe insulation 2a which has not undergone shrinkage can be accomplished in-line, however, the product, which is generally shown at the bottom portion of FIG. 5, has a tape 20 which is buckled substantially due to shrinkage of the product. This results in an unsightly product which, although it may function well, is not perceived to be of high quality or integrity. Shrinkage of the product can also result in compression or buckling of the tape, which can lead to adhesive failure or deterioration.

Figure 6:
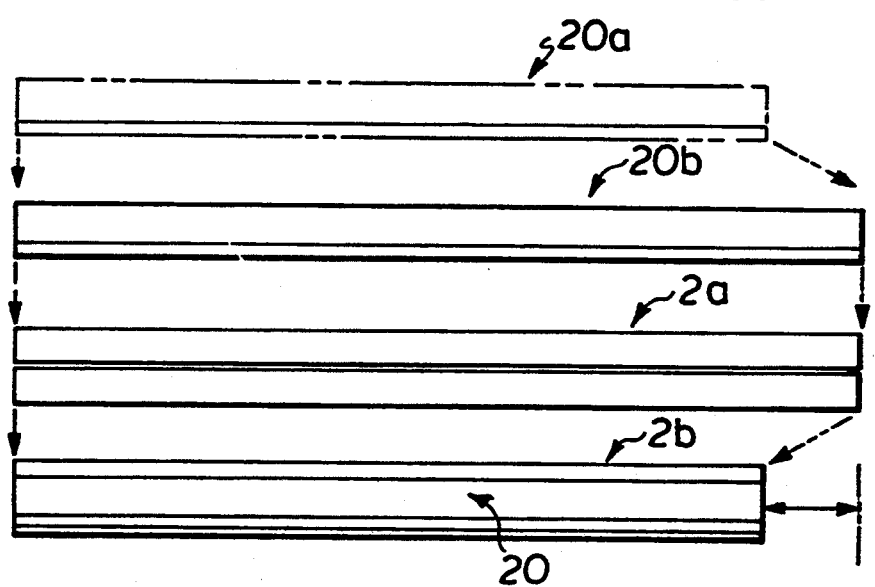
FIG. 6 is a schematic showing prestressing a tape prior to application to the extruded pipe insulation and the resulting pipe insulation and applied tape after shrinkage of the product has occurred.
Figure 7:
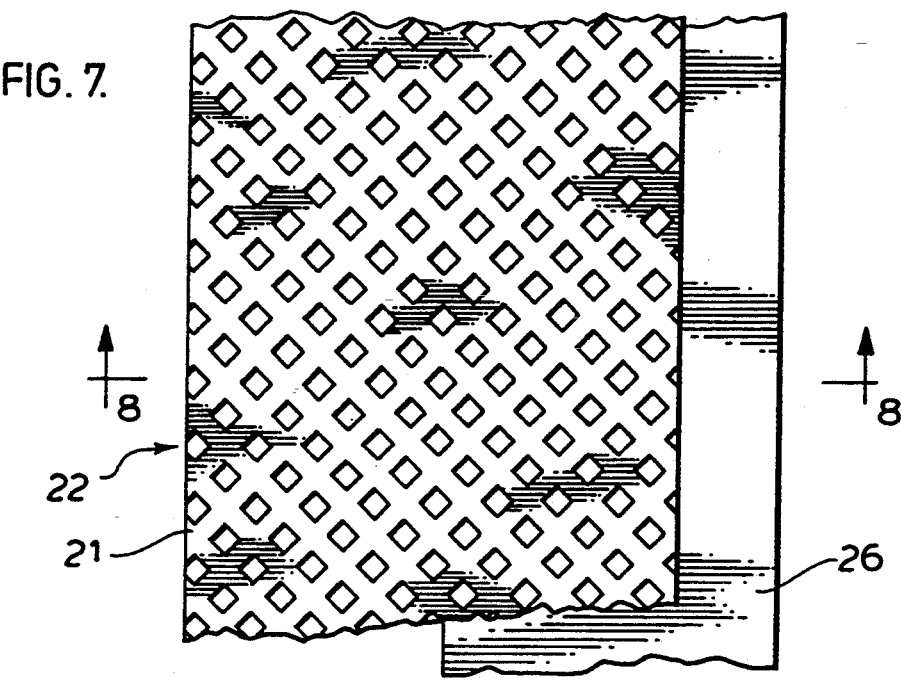
FIG. 7 is a top view showing the closing tape.
Figure 8:
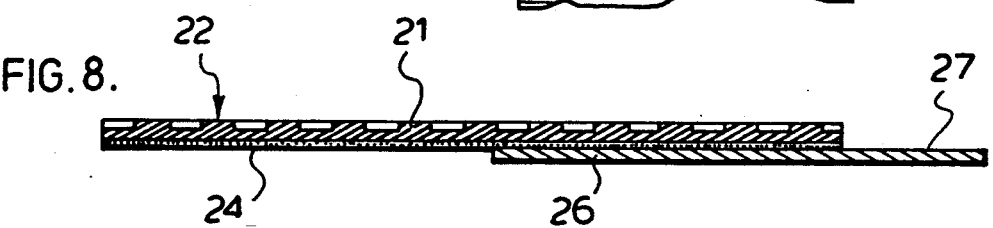
FIG. 8 is a sectional view of the closing tape taken along lines 8—8 of FIG. 7.
Figure 9:
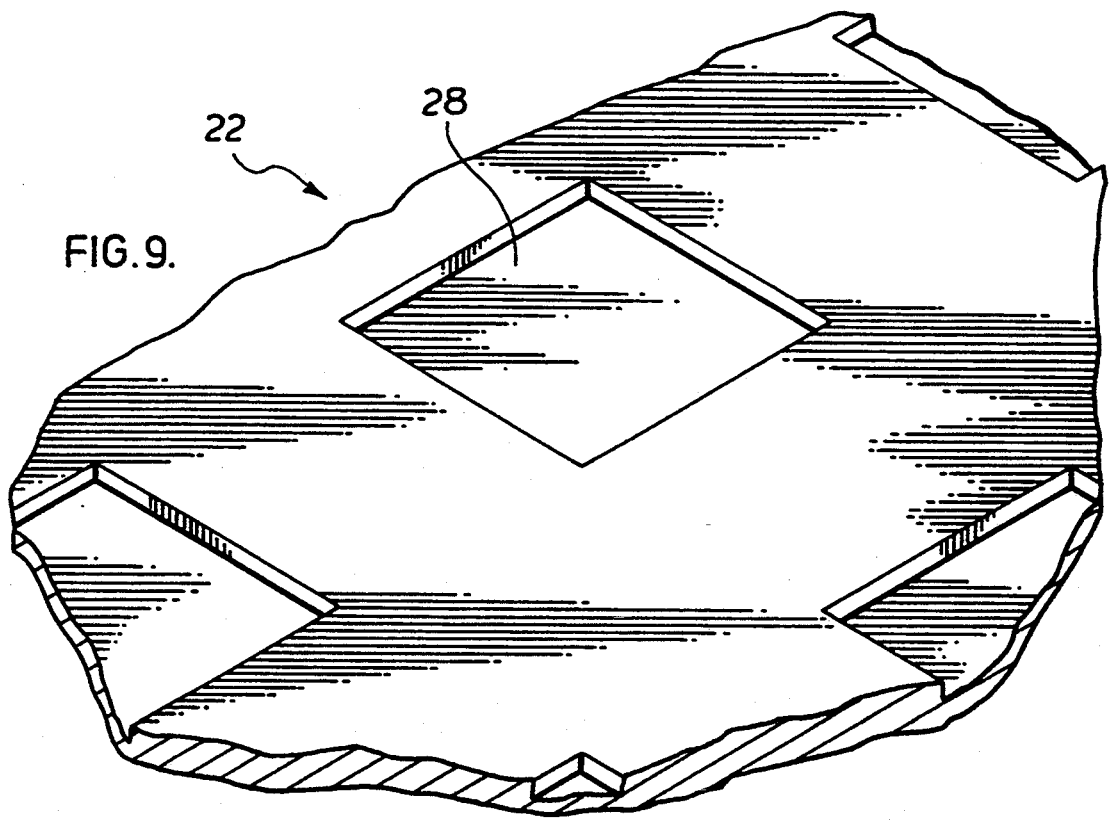
FIG. 9 is an exploded view of the body portion of the tape.

FIG. 6 illustrates one method for overcoming this problem. The closing tape 20a in a nonstressed state is generally shown in FIG. 6 and it is preferred that this tape undergoes an elongation or stretching process to produce the stressed tape 20b. This is held under tension and is then applied to the extruded product 2a which will undergo shrinkage. The pipe insulation which has now shrunk is shown as 2b and it can be seen that the tape 20 is nonbuckling. The stretching or elongation of tape 20a to a stressed state and applying of the tape to the extruded product which will undergo shrinkage results in a product where the stress within the tape is relieved by the shrinkage while the clean, simple application of the tape is maintained. This is shown at the bottom of FIG. 6. Buckling can also affect the final adhesion of the closing tape to the extruded article.

The closing tape 20 has a tape body 21 of a nonwoven fabric type material having characteristics similar to that of polyethylene and in particular, similar to the skin of the polyethylene pipe insulation. A nonwoven polypropylene material has proven satisfactory. One supplier of this material is Veratec Canada Inc. and the following is the product specification:

| GRADE: VS035.0B1 | | |
| --- | --- | --- |
| Basis Weight | 42 g./M$^2$ | 35 g./yd$^2$ |
|  |  | 1.25 oz./yd$^2$ |
| Thickness | 0.34 mm | 13.24 mil |
| Tensile (grab) |  |  |
| MD | 11.4 kg. | 25.0 lbs. |
| CD | 8.5 kg. | 18.8 lbs. |
| Elongation |  |  |
| MD | 116% |  |
| CD | 148% |  |

A UV stabilizer may be added.

A further nonwoven polypropylene fabric formed from thermally bonded fibers of polypropylene is sold under the trade mark LUTRASIL by Freudenburg Spunweb Company.

Another material that is suitable for the tape body is sold by Easy Gardner, Waco, Tex. under the trademark WEEDBLOCK. The WEEDBLOCK material is a linear, low density, perforated, polyethylene film having Carbon Black added as a pigment. This material without perforations would be more appropriate for outdoor applications. The material is UV stable, has good elongation properties, and accommodates some compression of the tape without producing buckles or severe wrinkling of the tape. Perforations expose the underlying adhesive to sunlight and other conditions that can affect the life of the adhesive.

It is also possible to use a polyethylene film, preferably having a thickness of about 2 mils. The film is preferably black to reduce penetration of UV light to the underlying adhesive. The film also preferably includes a UV stabilizer. The UV stabilizer and black colour are preferred to accommodate use of the pipe insulation in environments which include exposure to UV light, such as outdoor applications. If the intended environment does not require these stabilizing additives, they can be eliminated or reduced. It has been found that with product cut to a length of about 3 feet, a five pound tensile force stretches the film sufficiently to provide a product having a good appearance after shrinkage. Typical shrinkage is about 1¼ inches for a 3 foot length of insulation. The film is preferably embossed, which makes the film easier to apply (reduces side to side curl tendencies, among other benefits).

The thickness of the film can vary, however, it is preferable to use conveniently available thicknesses to avoid special runs and the higher cost thereof. Breakage of the tape can occur if too thin a tape is used, whereas too thick a tape increases the strength thereof, placing further demands on the adhesive bond of the tape to the article at the time of application of the tape to the insulation. The preferred thickness range is about 1 to 3 mils. It is apparent that the material of the tape, and the thickness thereof, the processing thereof (embossing) all contribute to the actual force required to elastically tension the tape as well as the performance of the tape once applied. Therefore, the thickness alone is not critical and this is a preferred range.

The closing tape 20 includes an adhesive layer 24 which is preferably a hot melt pressure sensitive thermoplastic adhesive which has been applied to the lower surface of the tape body 21. One suitable adhesive is manufactured by National Starch and Chemical Company and is sold under the DURO-TAK 4144 trademark. It is a hot melt pressure sensitive adhesive and has the following performance in addition to good initial bond for fast setup requirements:

|  | Polyester (2 mil) |
| --- | --- |
| 180° Peel (oz./in.) | |
| 20 minutes | 105 |
| 24 hours | 115 |
| Shear (hours) | 24 |
| 4 psi @ 72° F. | |
| Tack (oz./sq. in.) | 100 |

A U.V. stabilizer may be added when required.

A further adhesive is manufactured by NACAN Products Limited, Brampton, Ontario, under the trademark DURO-TAK 4134. This thermoplastic pressure sensitive hot melt adhesive is a solid and tan in colour with a viscosity of 25,000 mPa.s@150° C.

15,000 mPa.s@163° C.
8,000 mPa.s@177° C.

and a specific gravity of 0.94.

This adhesive is suitable with a large variety of surfaces, including paper, polyethylene and other plastics, glass, metals and inks. The adhesive has high tack for automatic label applications. This adhesive bonds well with polyethylene and polypropylene and is suitable for the present application. A U.V. stabilizer may be added when required.

Partially covering the adhesive layer 24 is a release liner 26. It can be seen that the release liner is offset to one side of the tape body 21 to expose to a tab portion 27 which is easily engaged to facilitate removal of the release liner 26 from the closing tape 20. The tape body is made of a nonwoven fabric, preferably polypropylene or linear polyethylene, which has been compressed in a number of compressed sections 28 which can also be perforated. This fabric has been found suitable for prestressing a sufficient extent for accommodating later shrinkage of the pipe insulation while maintaining a good adhesive bond by means of the pressure sensitive hot melt adhesive engaging the outer skin of the polyethylene pipe insulation 2 and the tape body 21. It has also been found that the fabric sold under the name WEEDBLOCK ™, which is a perforated type fabric, can have the adhesive and release liner applied thereto and cut in strips to form a tape. This tape demonstrates excellent compatibility with the prestressing and adhesion demands necessary to satisfactorily apply the tape to the product on an in-line basis, i.e. high initial adhesion to maintain prestressed condition and good adhesion to tape and polyethylene skin.

The preferred specialized tape is a combination of a particular nonwoven fabric type plastic tape to which a pressure sensitive adhesive is applied which is initially fully covered by a release liner and subsequently only a portion of the adhesive is covered by the release liner.

Figure 10:
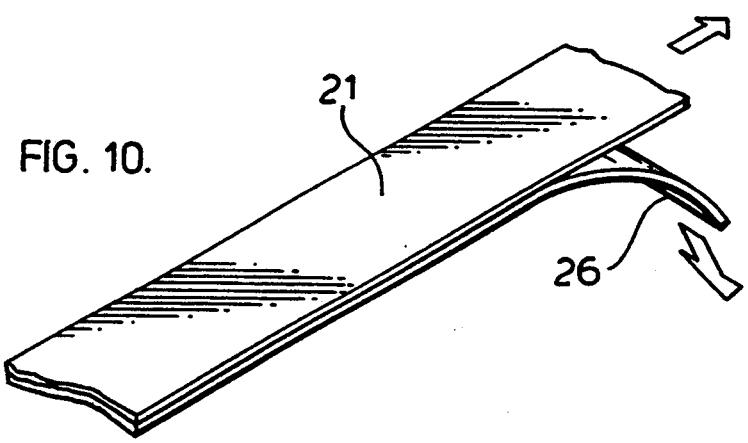
FIGS. 10, 11 and 12 illustrate various process steps regarding the securement of the tape to the article involving initially removing the release liner, cutting the release liner and reapplying a portion of the cut release liner in an offset manner thereby exposing a pressure sensitive portion on the lower surface of the tape for direct securement to the article with the release liner to the opposite side for eventual closing of the slit by the user in the field, with the offset release liner facilitating removal of the release liner.
Figure 11:
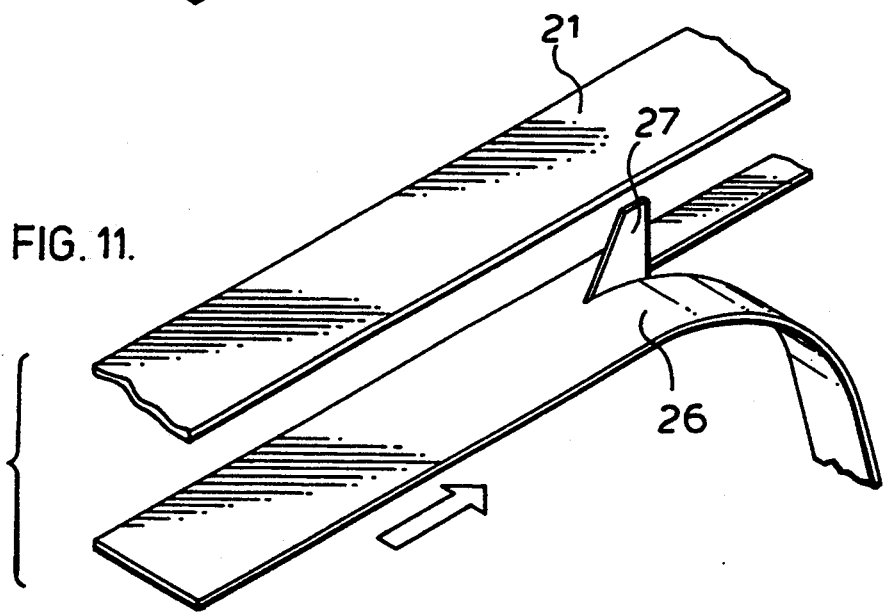

The tape, a portion of which is shown in FIG. 10, is initially formed in large sheets, with the release liner of the sheet covered with a pressure sensitive adhesive to which the polyethylene film is applied. This is similar to application of transfer adhesives. The large sheet is then slit into longitudinal segments, forming individual tapes 20. With these tapes, the release liner is fully covering the lower surface of the tape body.

In order to apply the tape to the extruded polyethylene pipe insulation, the release liner 26 is removed from the lower surface of the tape 21, as indicated in FIG. 10, and the release liner is subsequently cut by knife 27 to form a segment of the release liner 26. This segment is then reapplied to the tape, as indicated in FIG. 12, whereafter the tape can then be applied to one side of the slit in the pipe insulation. This aspect will be described with respect to FIGS. 13 through 16.

Figure 13:
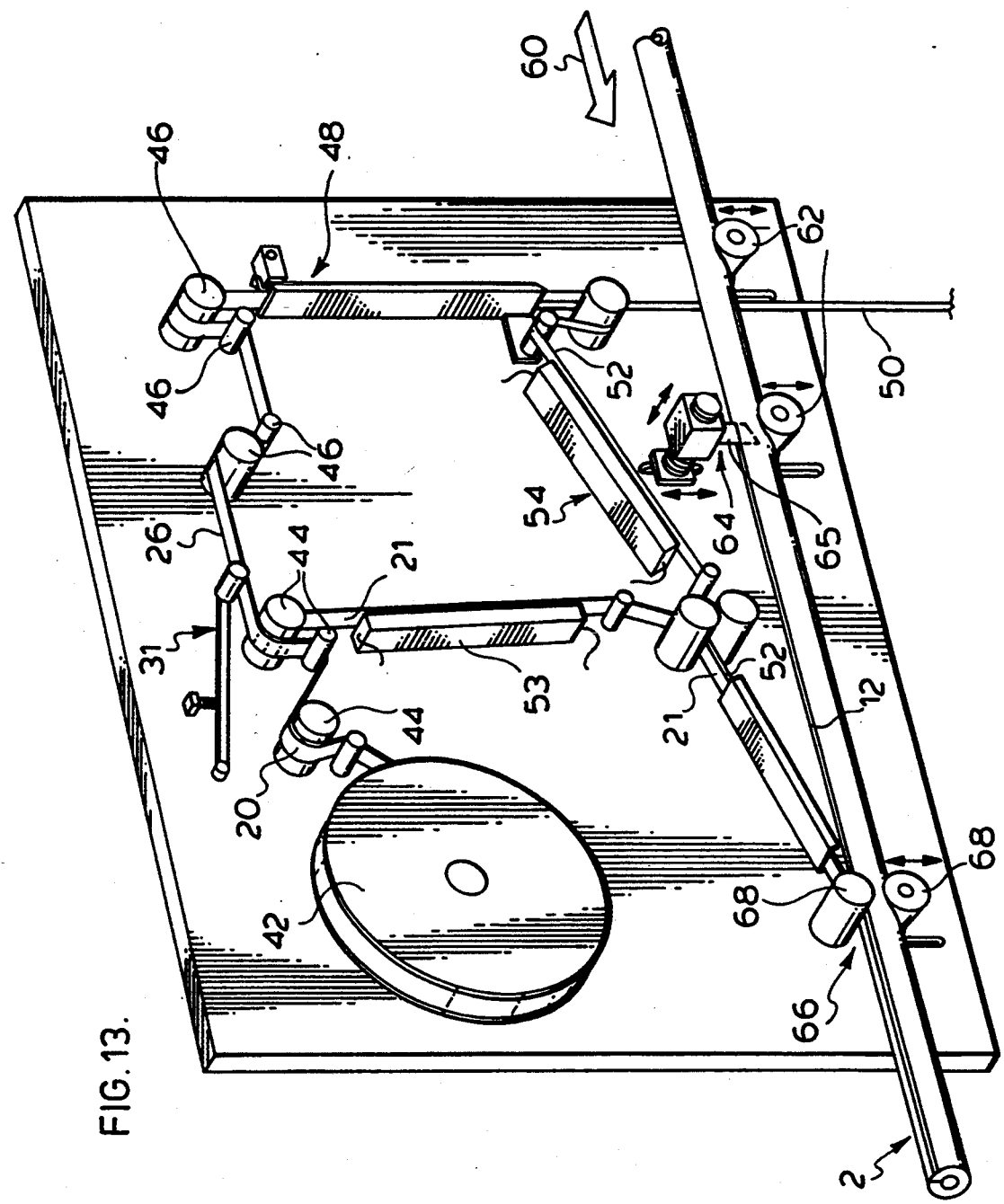
FIG. 13 is a perspective view of an arrangement for processing of the tape and applying the tape to an extruded product.

An arrangement for processing of the closing tape and applying of the closing tape to the extruded pipe insulation is shown in FIG. 13. A supply of tape 42 passes through a series 44 of rollers and guides to introduce some initial tensioning, and at the end of such series of rollers and guides, is separated into the tape body 21 and the release liner 26. A tensioning arrangement 31 engages the release liner 26 after separation. The release liner passes through a further series of rollers and guides 46 to add additional tension due to the drag about the rollers. At the end of the second series of rollers 46, the release liner passes through a cutting station, shown as 48, and is slit into two portions, a portion 50 which is eventually scrapped or recycled and a portion 52 which is reapplied to the tape. A heater 53 can be provided for heating of the tape body and can be adjusted for achieving the desired prestressing and other characteristics of the tape necessary to accommodate shrinkage of the extruded insulation. It can be appreciated that the extruded polyethylene pipe insulation is still quite hot and selecting the appropriate temperature for the tape may assist in achieving effective characteristics of the tape relative to the polyethylene such that shrinkage of the polyethylene, as discussed previously, is not a problem with respect to destroying the appearance of the tape on the product while maintaining effective adhesion. A heater 54 can be used for heating of the portion 52 of the release liner which is reapplied to the tape. The addition of heat may not be required, depending upon the tape characteristics.

The extruded polyethylene pipe insulation 2 is being drawn or pulled through the apparatus in the direction of arrow 60. Support rollers 62 are adjustably mounted to accommodate varying diameters of extruded pipe insulation 2. These are generally fixed for a given size pipe insulation. Immediately above the second roller is a cutting station 64 having a knife 65. Downstream of the cutting station 64 it can be seen that the pipe insulation 2 now has the slit 12. The slit 12 is aligned with the station 66 for applying the tape to the extruded slit pipe insulation. The tape is applied to one side of the slit 12 with the portion of the tape having the release liner 52 thereon partially overlies and is to one side of the slit 12. In this way, when the release liner is removed, the tape can be used for closing of the slit, as the tape effectively bridges the slit 12.

Figure 14:
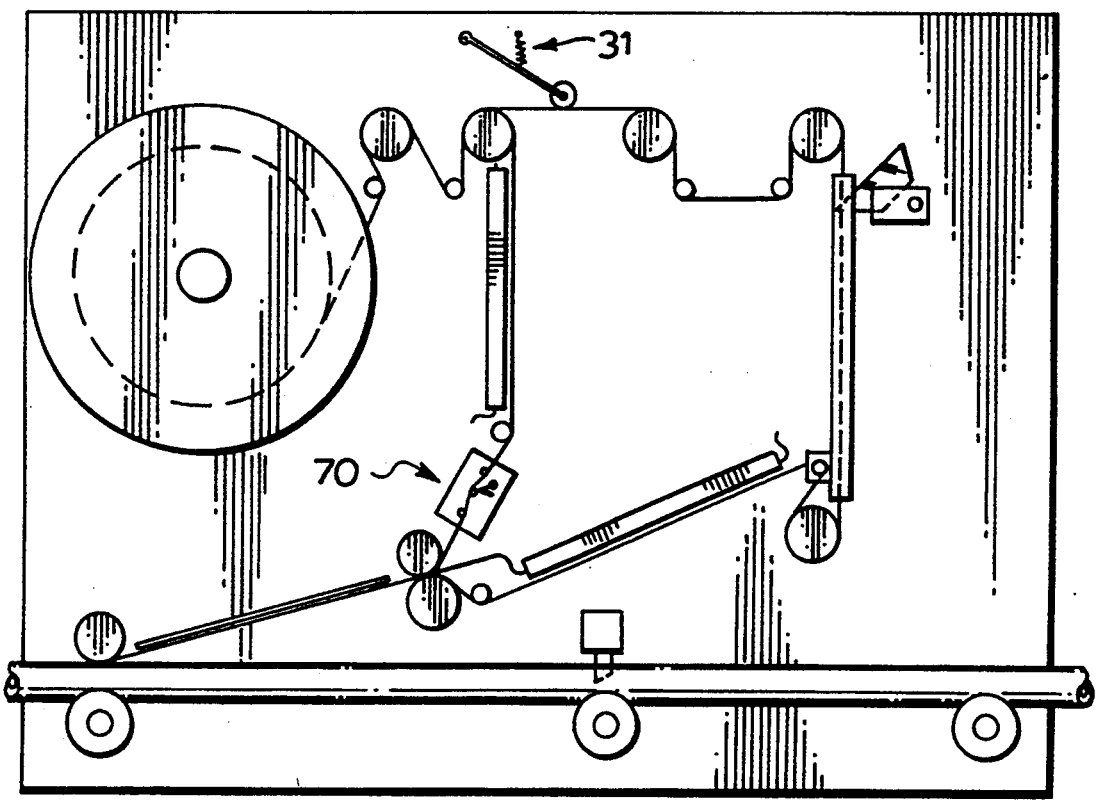
FIG. 14 is a front view of that apparatus.

In FIG. 14, it is illustrated that the arrangement prior to the reengaging of the release liner with the tape body, the tape body can include a tensioning arrangement, generally shown as 70, to prestress the tape and thereby effectively merge it with the release liner, which is also in a stressed state due to the series of rollers and tensioning arrangement 31. Although a spring type tensioning arrangement is shown for each of these, it can be appreciated that additional tensioning can be applied merely by increasing the drag or the number of rollers and guide pins about which either of these substrates pass or in any other suitable manner.

Figure 15:
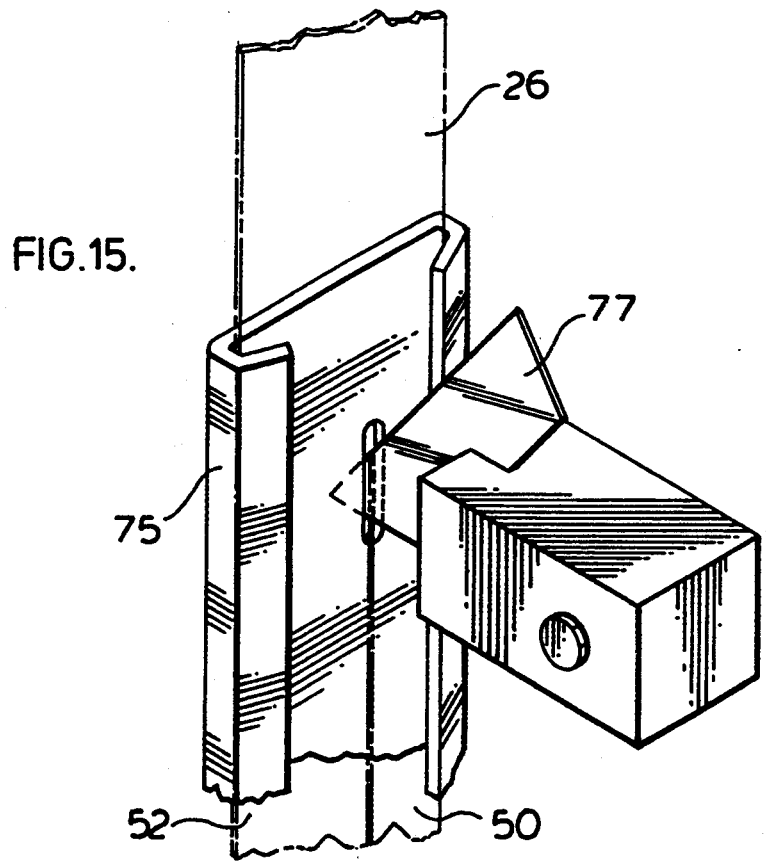
FIG. 15 is a partial perspective view showing cutting of the release liner.

The cutting of the release liner is shown in FIG. 15 where it can be seen that the release liner 26 is maintained in an accurate manner due to the guide arrangement 75 which engages either side of the release liner 26. The knife 77 cuts the release liner into the two portions 50 and 52.

Figure 16:
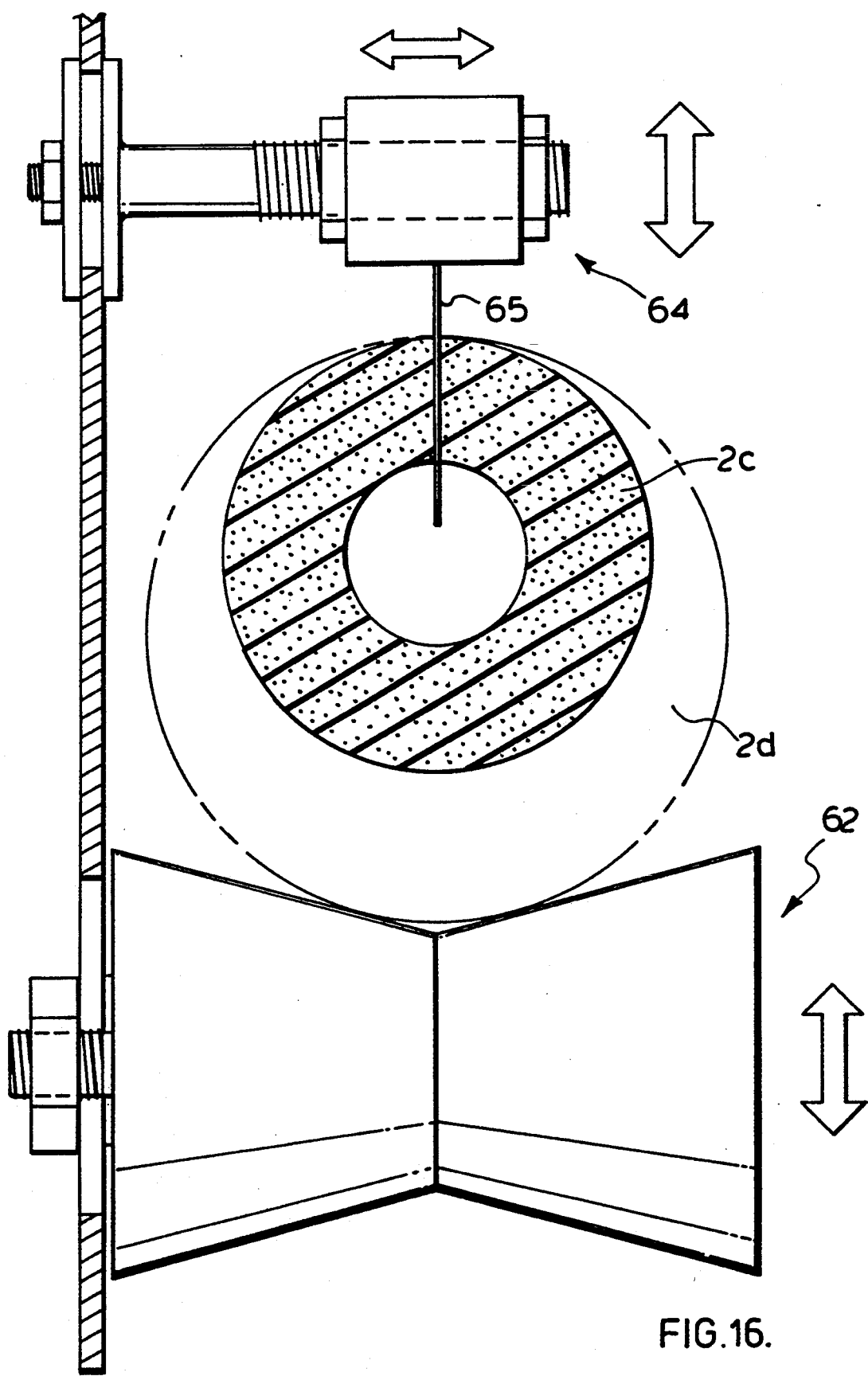
FIG. 16 is an end view showing an arrangement for cutting of the article and maintaining the position of the cut relative to products of varying diameters.

FIG. 16 shows additional details of the support rollers 62 and the cutting station 64 having the knife 65. As shown in FIG. 13, both the cutting station 64 and the support roller 62 are adjustable in the vertical direction to define different spacings between the bottom of the knife 65 and the support surface of the roller 62, with pipe insulation shown as 2c, it is relatively small in size and the support roller 62 would have to move vertically upwards to engage the lower surface of the pipe insulation 2c. Because of the "V" shape of the roller 62, the insulation will maintain its centered position relative to the knife and, thus, the vertical adjustment should be sufficient. There is a vertical adjustment with respect to the knife as well as a horizontal adjustment with respect to the knife. In the case of larger pipe insulation, as illustrated in FIG. 16 as 2d, the roller 62 would be in the position shown and depending upon the thickness of the walls between the outer and inner walls of the pipe insulation, it may be necessary to adjust the knife. In the embodiment of FIG. 16, the wall thickness of the small pipe insulation 2c and the larger pipe insulation 2d could be equal whereby the cutting arrangement 64 would not have to change and adjustment of the lower roller 62 would be sufficient.

The actual cutting of the extruded product is relatively precise due to pulling of the extruded product past the cutting station, and with this arrangement, the position of the slit 12 is also relatively constant. It can be seen that the rollers 68, which apply the tape to the pipe insulation, also have a variable spacing and ensure a good intimate contact of the pressure sensitive adhesive on the lower surface of the tape to the pipe insulation.

With this arrangement, it is possible to effectively prestress the tape, taking into account shrinkage characteristics of the pipe insulation which continue to occur after the tape has been applied to the product. In this way, the tape can be applied in a precise and effective condition, such that, to the consumer, the product has high quality in that the tape has not buckled, and for the manufacturer a more efficient method has been used which allows the in-line application of tape and avoids a separate step of applying the tape after the shrinkage has occurred.

An alternate embodiment of the invention is shown in FIGS. 17 through 21. An alternate numbering scheme has been used to avoid confusion with the earlier figures.

Figures 17, 18:
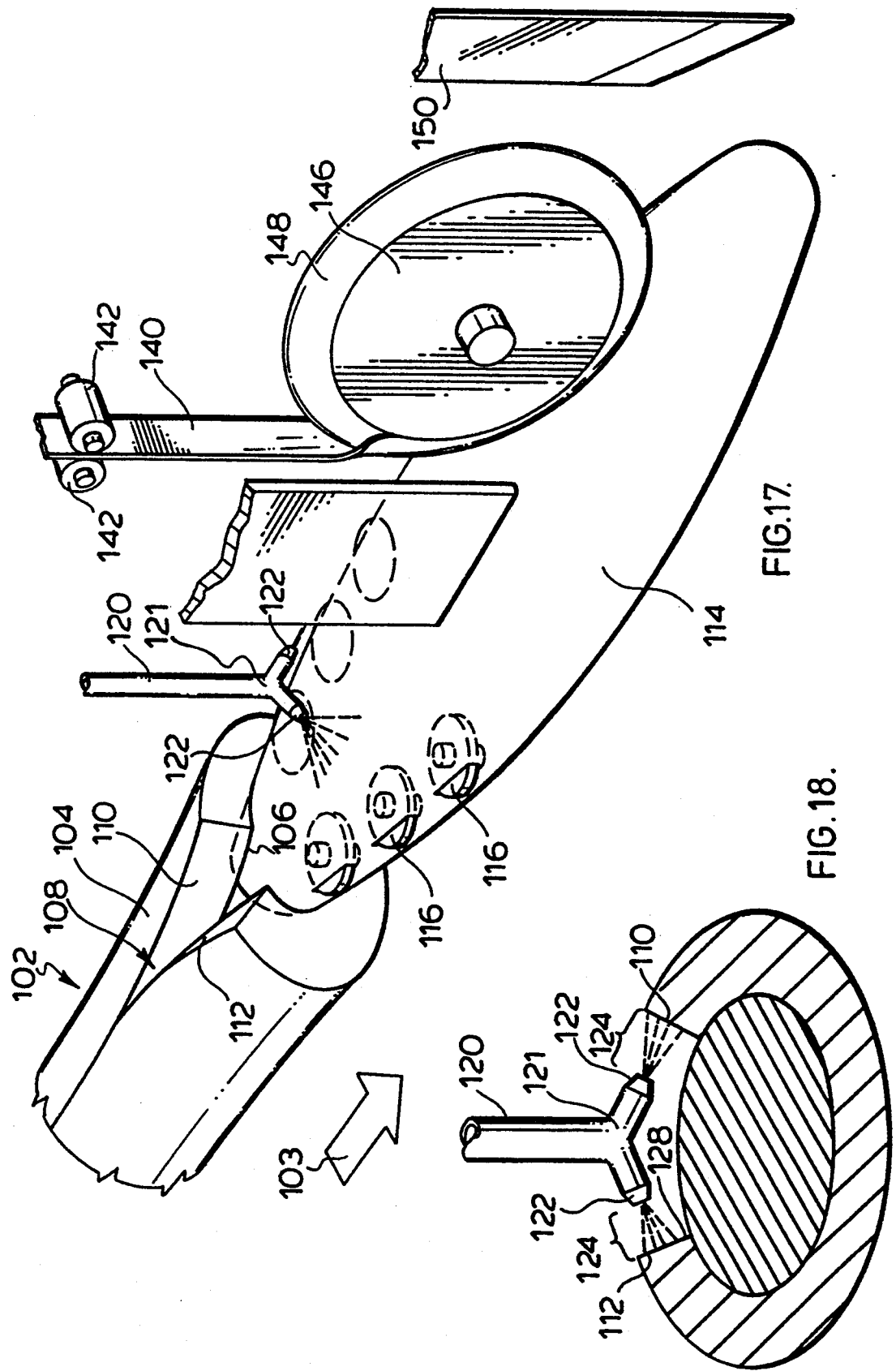
FIG. 17 is a partial perspective view showing an alternate embodiment for making an adhesively closable pipe insulation.
FIG. 18 is a sectional view showing the application of a pressure sensitive hot melt adhesive to the pipe insulation.
Figure 19:
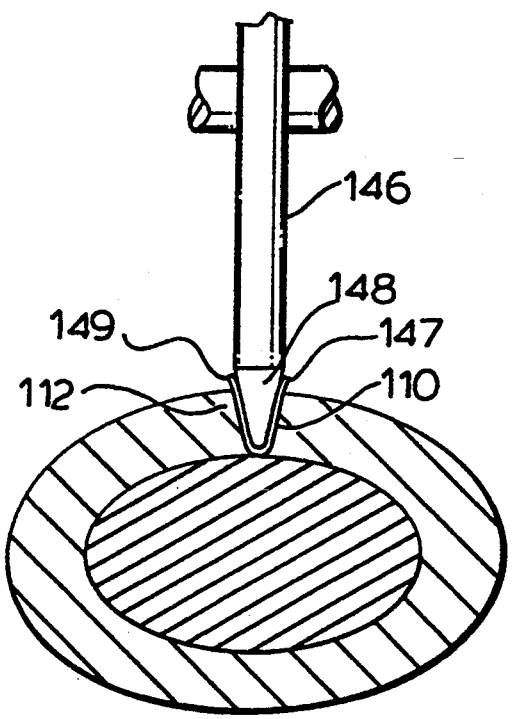
FIG. 19 is a sectional view showing securement of a removable release substrate to the pipe insulation.
Figure 20:
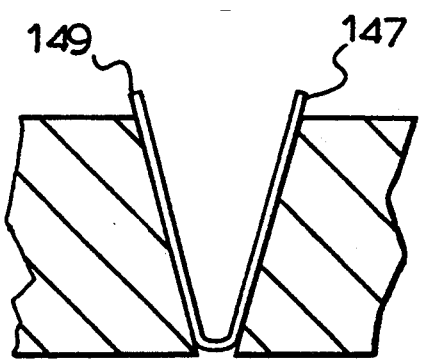
FIG. 20 shows a sectional view of the pipe insulation with the releasable substrate applied thereto.

The pipe insulation 102 is being fed in the direction 103 over the mandrel 114. The pipe insulation 102 is preferably of a polyethylene foam material which has just been extruded and cooled sufficiently to allow handling thereof. It has an outer wall or skin 104 and inner wall or skin 106. The pipe insulation has already been cut to form the longitudinal slit 108 running the length of the insulation. The slitting operation forms the opposed wall sections 110 and 112. The pipe insulation is guided over the mandrel 114 and the movement over the mandrel is assisted, in this case by rotatable wheels or bearings generally shown as 116. Other arrangements are possible for allowing the pipe insulation to move over the mandrel to spread the opposed wall sections 110 and 112, as indicated in FIG. 18. The pipe insulation is typically spread about 1 to 1½ inches. The pipe insulation is spread to expose wall sections 110 and 112 to the spray head 121, which is connected to the pressure sensitive hot melt adhesive supply 120, and feeds the pressure sensitive hot melt adhesive to the spray nozzles, indicated as 122. A fine spray of pressure sensitive hot melt adhesive is applied to the opposed wall sections 110 and 112 and the pressure sensitive hot melt adhesive is preferably at a temperature of about 325° F. when it exits the spray nozzles 122. The pressure sensitive hot melt adhesive cools as it passes through the air gap (approximately ½ inch), indicated as 124 in FIG. 18, and strikes the opposed walls 110 and 112 at a temperature about the melting temperature of the pipe insulation. The pressure sensitive hot melt adhesive preferably has a melting temperature at least 20° F. above the melt temperature of the foamed polyethylene. The hot application of the adhesive to the walls 110 and 112 produces better adhesion than if an adhesive is applied cold to these surfaces.

The pipe insulation is still warm from the extrusion process and a very strong bond between the wall section and the adhesive is achieved. The strength of the bond is also improved due to the convoluted surfaces resulting from cutting of the various cells of the pipe insulation. Therefore, the adhesive strongly adheres to the wall sections. After the adhesive has been applied, the extruded product continues to move across the mandrel 114 towards the removable release film indicated as 140. This removable release film is preferably of a silicon coated, low strength polyethylene which can be easily elongated approximately 2% of its length by means of the drag of the film and the tensioning rollers 142. In any event, the removable releasable film is brought into contact with the opposed walls 110 and 112 on the V wheel 146 and is heated by the adhesive and the pipe insulation. The film is generally centered on the V edge 148 of the V wheel and, at this point, the pipe insulation 102 is no longer being spread (see FIG. 19) and opposed walls 110 and 112 are being forced into contact with the V edge 148, with the removable tape substrate 140 trained thereabout. As the extruded product continues to advance in the direction 103 immediately downstream of the V wheel 146, the product will be in the condition generally shown in FIG. 20.

Figure 21:
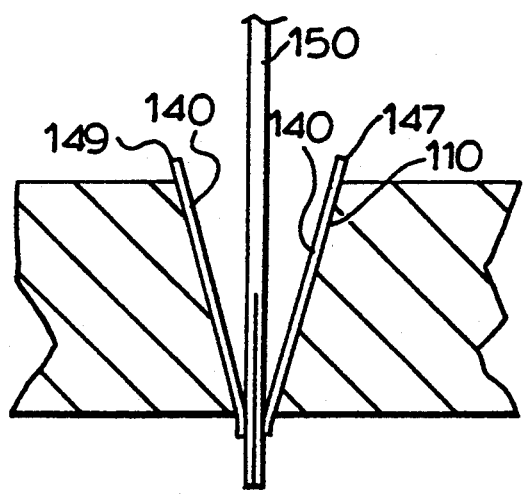
FIG. 21 shows the operation of cutting of the releasable substrate in a central location.

As illustrated in FIG. 18, the adhesive is only applied on approximately ¾ of the surface area of the opposed walls and is not applied to the edge of these walls immediately adjacent the mandrel. This provides a small safety margin and it has not been found necessary to fully coat these surfaces to provide effective securement thereof. In contrast, the removable release tape penetrates sufficiently to fully cover the inside edge of the adhesive while also forming two releasable tabs, generally indicated as 147 and 149 projecting above the pipe insulation. It can been seen that the substrate is still joined centrally between the opposed walls 110 and 112. A knife, generally indicated as 150, serves to cut the removable release film 140, as indicated in FIG. 21, to thereby form two removable release films, one for each of the opposed walls 110 and 112.

As previously described, the user of the product merely forces the pipe insulation through slit 108, whereafter the removable release film 140 is removed from each of the opposed walls 110 and 112 and these walls are brought into contact to effect adhesive securement therebetween. It has been found that this provides an excellent bond and it also believed that the closed cell nature of the product assists in reducing degradation of the adhesive by oxygen. The adhesive preferably includes the appropriate compositions to reduce oxygen degradation, but this type of butt seal between two opposed walls of a closed cell foamed product is highly successful.

As previously discussed, the extruded foam product will undergo shrinkage in its length, typically in the range of about 2%. It is for this reason that the removable tape substrate is tensioned approximately 2% and the removable release film is selected to require only minimal force to effect a 2% elongation. In this way, the adhesive and the product does not need to oppose a large force and can easily maintain the film tensioned until such time as the product has undergone shrinkage, at which point the tensile force will be dissipated. By using this particular arrangement, there is no buckling between the removable release film and the product, and the film lies flat against the respective opposed wall sections 110 and 112 to properly cover and protect the adhesive. The removable release film with the extending tabs 147 and 149 make it extremely convenient to remove these portions when the pipe insulation has been properly placed about a pipe.

The spray of the pressure sensitive hot melt adhesive against the walls of the pipe insulation forms a particularly strong bond due to the penetration of the adhesive into the cells of the product as well as the high temperature application to the walls, which are still at an elevated temperature.

By spray-applying pressure sensitive hot melt adhesive onto the foam which is still very warm, inserting the release film, in a stretched condition, into the slit and squeezing the slit together onto the release film, results in a very good product.

It is believed the heat of the adhesive partially reduces the tensile force in the release film. The temperature of the film, adhesive and foam adjacent the opposed walls normalize and cool at the same rate, allowing the film and foam to shrink at the same rate and end up the same length when cooled. This is improved by having the film also being of low density polyethylene.

Application of the pressure sensitive hot melt adhesive to the film followed by application of both to the foam is not as effective and/or more difficult to control.

Pressure sensitive hot melt adhesives, when spray-applied to the product walls in the manner shown herein, have proven very effective, however, it is possible to use two different adhesive combinations which, when brought together, react and form a chemical bond. In this embodiment, two separate spray heads would be used, one for spraying each of the components. When the walls are finally brought together, there is very strong adhesion of each of the components to the cell walls, as discussed above, as well as a very strong bond of the two components to each other.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. An in-line method of producing pipe insulation having a longitudinal slit therein with an applied pressure sensitive adhesive located for adhesively bonding opposed walls of the pipe insulation located either side of said slit, and a removable release film for temporarily protecting the applied adhesive layer, said method comprising extruding foamed pipe insulation which is subject to substantial post extrusion shrinkage, partially cooling the pipe insulation to allow handling thereof, and subsequently forming a longitudinal slit by means of which the pipe insulation in its final application may be forced over a pipe to sleeve the pipe; spreading the slit pipe insulation to expose said opposed walls of the pipe insulation either side of the slit, applying a pressure sensitive adhesive to at least one of the exposed walls, tensioning the removable release film under a low tension force to cause an elongation thereof to compensate for the post extrusion shrinkage, and applying said removable release film to said foamed pipe insulation to cover said pressure sensitive adhesive while said pipe insulation is still subject to post extrusion shrinkage; said pressure sensitive adhesive transferring the tension force to the pipe insulation and maintaining position of the tensioned release film relative to the pipe insulation such that the release film covers and protects the pressure sensitive adhesive during and after post extrusion shrinkage of the foamed pipe insulation.

2. An in-line method of producing pipe insulation as claimed in claim 1 wherein said pressure sensitive adhesive is spray-applied to the pipe insulation.

3. An in-line method of producing pipe insulation as claimed in claim 2 wherein said pipe insulation is slit to expose cell formations on said opposed walls and said pressure sensitive adhesive is a hot melt adhesive and is applied at a temperature about the melting temperature of the foamed article to said exposed cell formations of the foamed pipe insulation.

4. An in-line method of producing pipe insulation as claimed in claim 3 wherein the pressure sensitive hot melt adhesive is initially at a temperature above the melt temperature of the foamed pipe insulation and is sprayed on the opposed walls through an air gap which cools the adhesive sufficiently such that it contacts the pipe insulation with an evenly distributed spray at a temperature about the melt temperature of the pipe insulation.

5. An in-line method of producing pipe insulation as claimed in claim 4 wherein said pressure sensitive hot melt adhesive is applied to both of said opposed walls.

6. An in-line method of producing pipe insulation as claimed in claim 5 wherein the release film prior to application is in a V shape and is located between said opposed walls which are forced together against the V section, and wherein said V section is subsequently split into two sections.

7. An in-line method of producing pipe insulation as claimed in claim 6 wherein said longitudinal slit is formed by cutting the pipe insulation in a nonradial manner to increase the width of the exposed wall sections and improve adhesion properties of the final product.

8. An in-line method of producing pipe insulation as claimed in claim 6 wherein said slit is formed in a tangential manner relative to the inner wall of the pipe insulation.

9. An in-line method of producing insulation as claimed in claim 4 wherein said pressure sensitive hot melt adhesive is applied to leave a portion of the opposed walls adjacent an inner peripheral surface free of adhesive.

* * * * *